(12) United States Patent
Fujiwara

(10) Patent No.: US 7,929,843 B2
(45) Date of Patent: Apr. 19, 2011

(54) SYSTEM, METHOD, COMPUTER PROGRAM PRODUCT FOR DATA REPRODUCTION WITH A FREQUENCY OF A FIXED CLOCK SIGNAL HIGHER THAN FOR VARIABLE CLOCK SIGNALS

(75) Inventor: Naoki Fujiwara, Tokyo (JP)

(73) Assignee: Sony Corporation, Tokyo (JP)

( * ) Notice: Subject to any disclaimer, the term of this patent is extended or adjusted under 35 U.S.C. 154(b) by 1269 days.

(21) Appl. No.: 11/510,835

(22) Filed: Aug. 28, 2006

(65) Prior Publication Data

US 2007/0053655 A1 Mar. 8, 2007

(30) Foreign Application Priority Data

Sep. 2, 2005 (JP) ................. 2005-255651

(51) Int. Cl.
*H04N 5/783* (2006.01)
(52) U.S. Cl. .................................................. 386/344
(58) Field of Classification Search .............. 386/68, 386/124–126, 131, 344
See application file for complete search history.

(56) References Cited

U.S. PATENT DOCUMENTS

| | | | |
|---|---|---|---|
| 5,583,652 A | 12/1996 | Ware | |
| 5,664,044 A | 9/1997 | Ware | |
| 6,201,776 B1 | 3/2001 | Bae | |
| 2003/0231865 A1 | 12/2003 | Kishi | |

FOREIGN PATENT DOCUMENTS

| | | | |
|---|---|---|---|
| JP | 2-24712 | * | 1/1990 |
| JP | 7-303240 | | 11/1995 |
| JP | 10-126745 | | 5/1998 |
| JP | 11-273240 | | 10/1999 |
| JP | 2001-054066 | * | 2/2001 |
| JP | 2001-54066 | | 2/2001 |
| JP | 2004-56761 | | 2/2004 |

OTHER PUBLICATIONS

Machine generated translation of JP 2001-054066 to Nakamura, Feb. 2001.*

* cited by examiner

*Primary Examiner* — David E Harvey
(74) *Attorney, Agent, or Firm* — Oblon, Spivak, McClelland, Maier & Neustadt, L.L.P.

(57) ABSTRACT

Disclosed are a system, a method, and a computer program for reproducing high-quality image free from jerkiness even when the content reproducing speed is varied. The clock frequency set at a high level according as the content reproducing speed ascends is outputted from the system clock, and such variable clock signal outputted from the system clock is inputted to each processing section in charge of processing of content reproduction such as the data storage section, decoding section, buffer control section, output control section, and output display section. In these sections, processing of data is carried out by regulating the processing speed in accordance with the clock signal having a frequency conforming to the content reproducing speed. Such configuration allows all-frame variable-speed display without needing frame decimation operation even at a high-speed reproduction, for example, resulting in realization of reproduction of jerkiness-free, high-quality image.

11 Claims, 15 Drawing Sheets

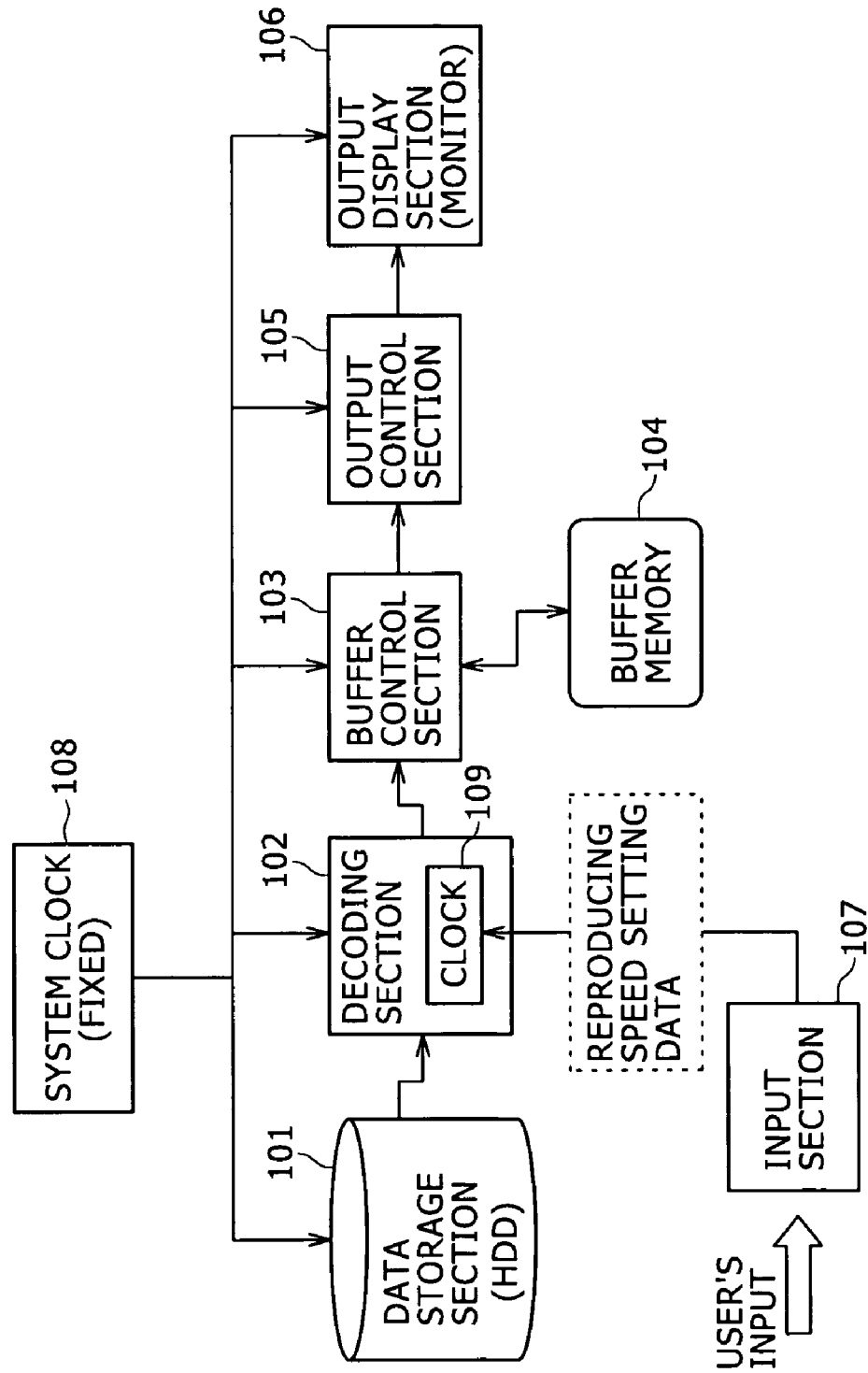

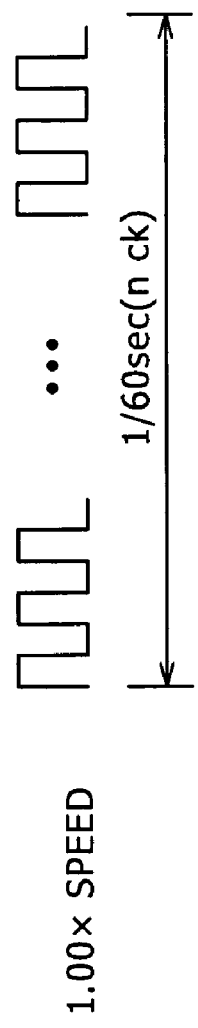
FIG. 6A  1.00× SPEED
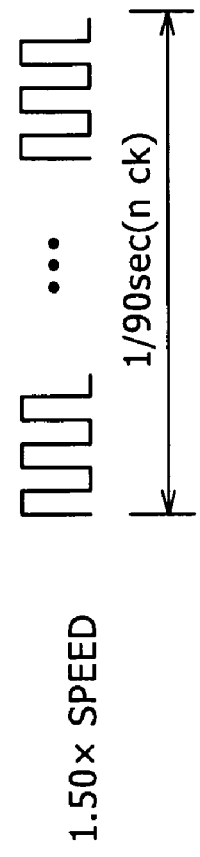
FIG. 6B  1.50× SPEED
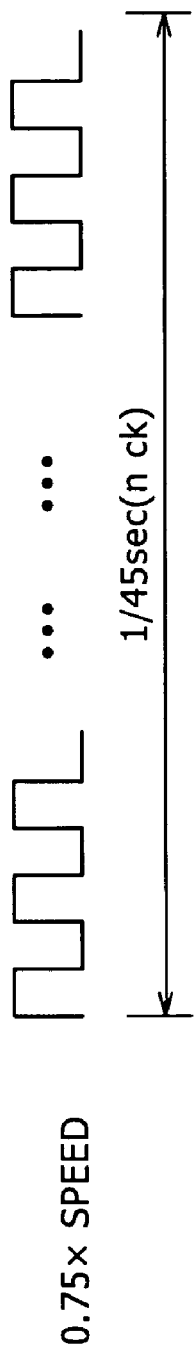
FIG. 6C  0.75× SPEED

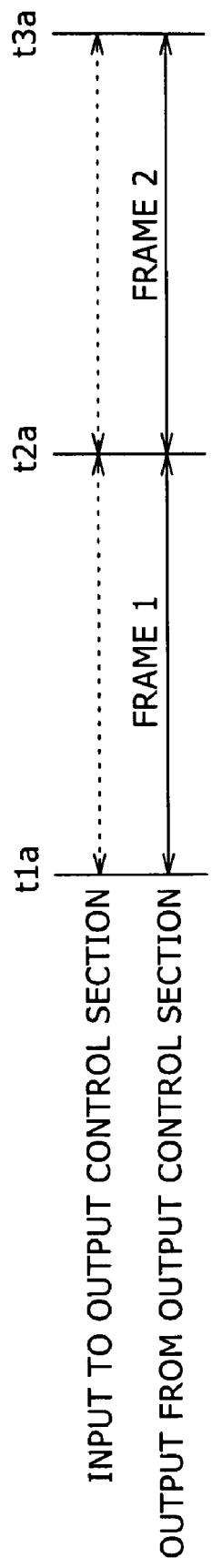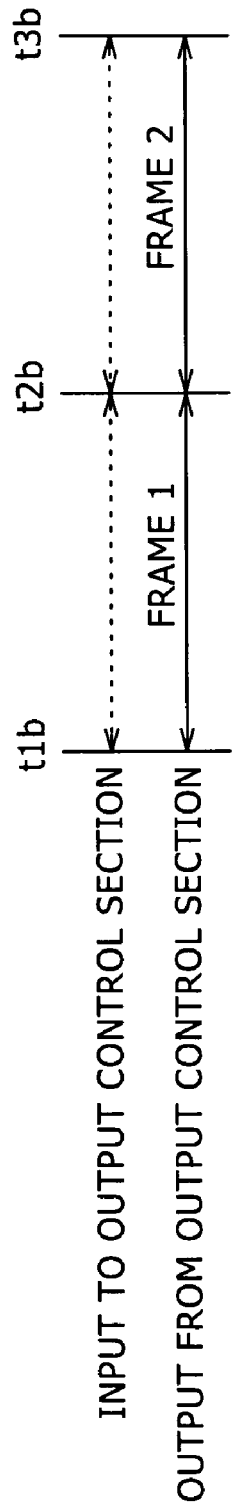

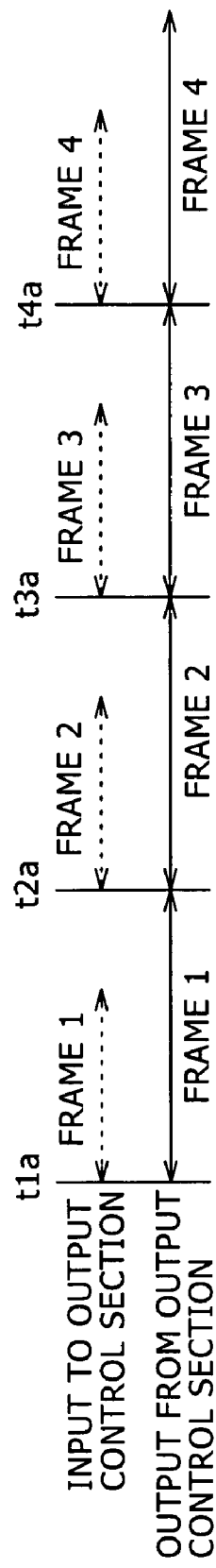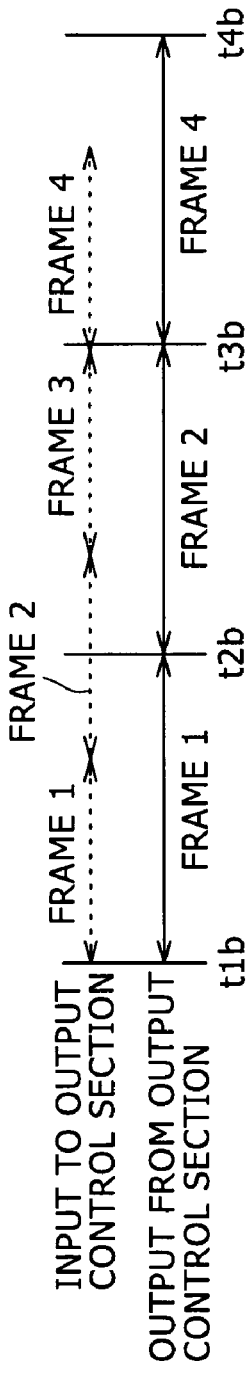

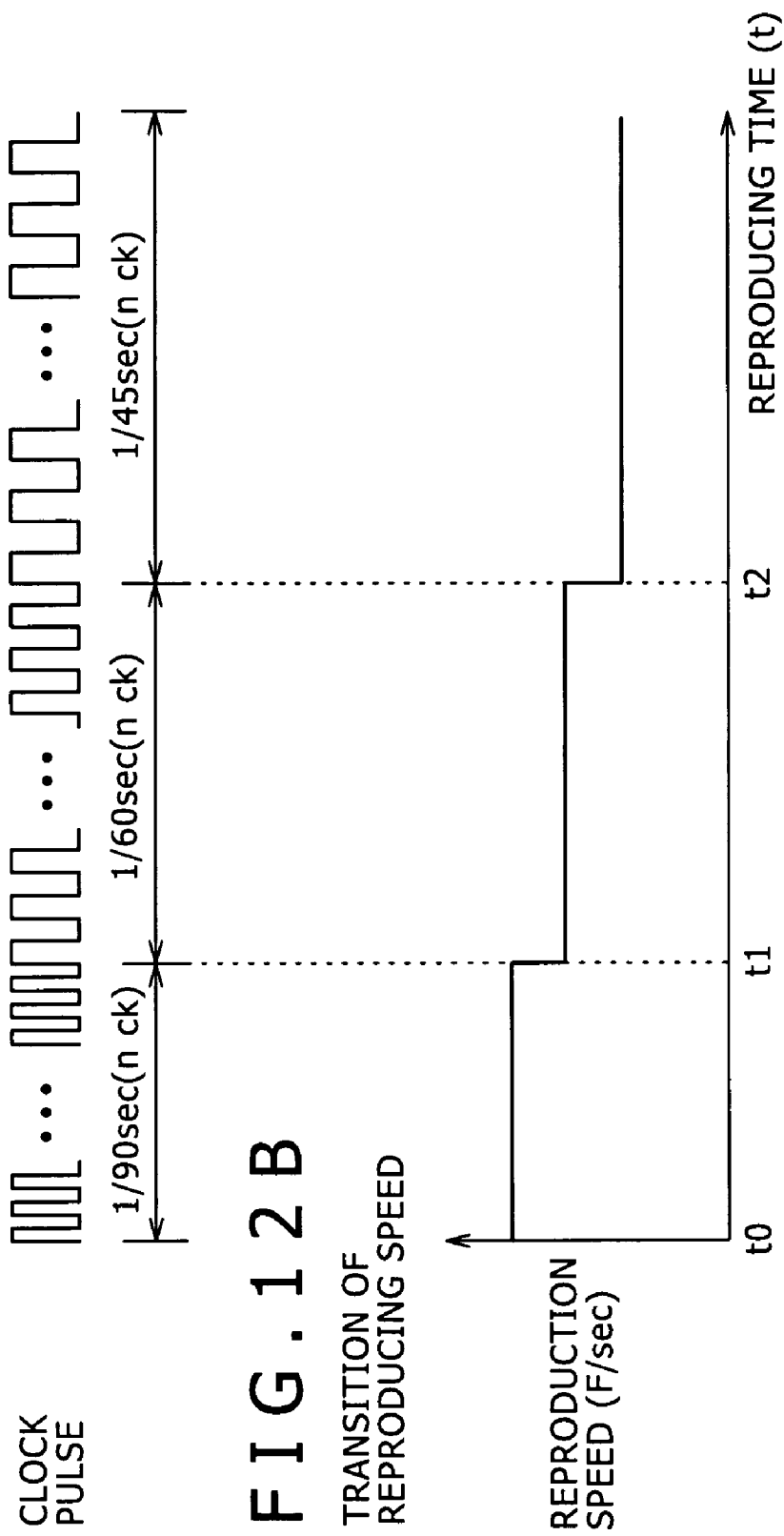

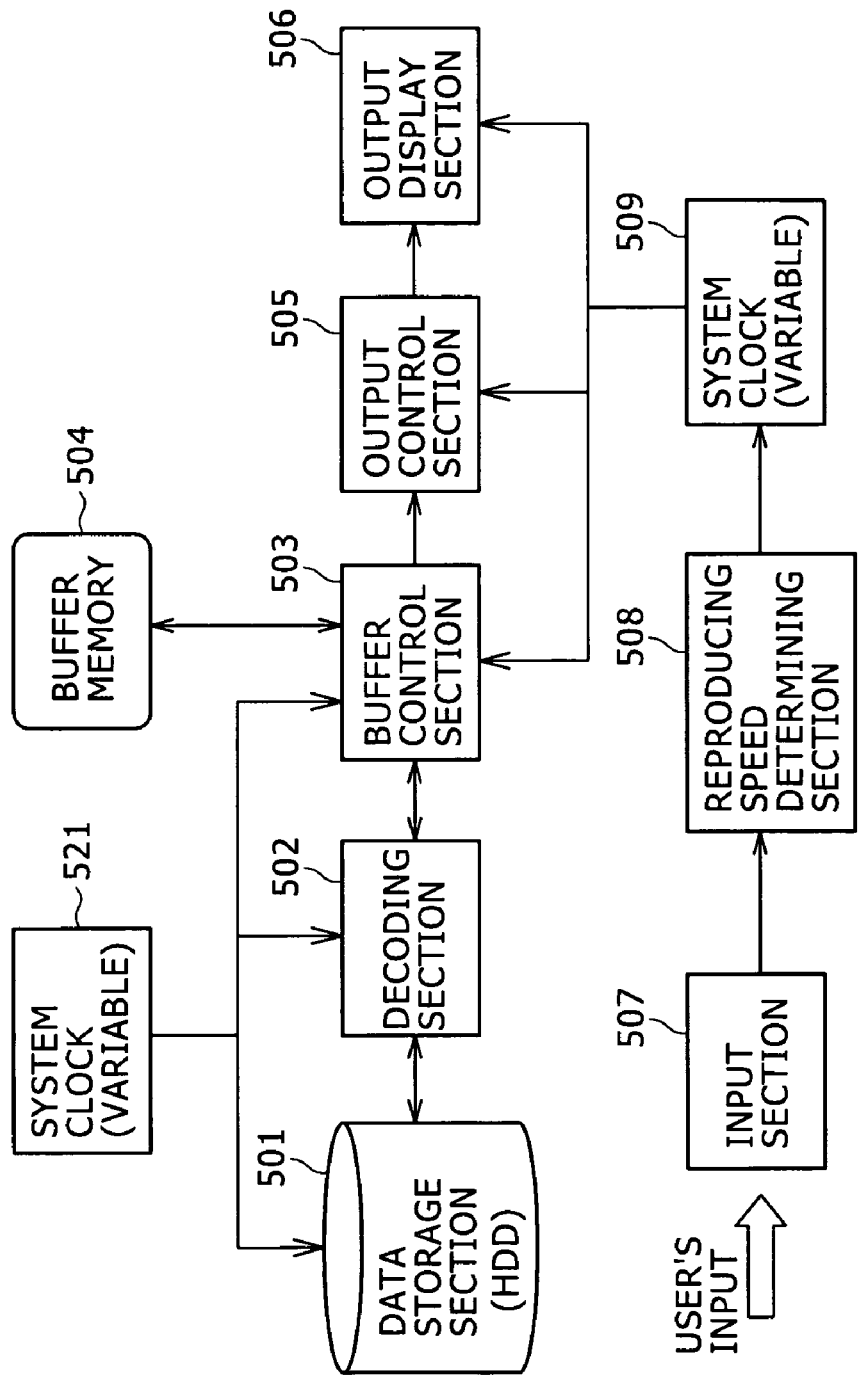

SYSTEM, METHOD, COMPUTER PROGRAM PRODUCT FOR DATA REPRODUCTION WITH A FREQUENCY OF A FIXED CLOCK SIGNAL HIGHER THAN FOR VARIABLE CLOCK SIGNALS

CROSS REFERENCES TO RELATED APPLICATION

The present invention contains subject matter related to Japanese Patent Application JP 2005-255651 filed in the Japanese Patent Office on Sep. 2, 2005, the entire contents of which are incorporated herein by reference.

BACKGROUND OF THE INVENTION

This invention relates to a data reproduction system, a data reproducing method, and a computer program therefor and, in particular, to the data reproduction system, the data reproducing method, and the computer program capable of reproducing high-quality image while preventing occurrence of jerkiness in the course of reproduction processing of content under a varied reproducing speed, e.g., under a high speed or a low speed.

Most of the hard-disc recorders, DVD recorders, or other data reproducing devices of late allow users to set a desired reproducing speed, such as high-speed reproduction or slow-speed reproduction, in reproducing the content recorded in hard-disc, DVD, or other recording media.

Generally practiced high-speed reproduction by the data reproduction equipment in the past is to decimate the data, in other words, to omit some out of the all frames composing a moving image content, one frame each at regular intervals, then processing the rest of frames after such decimation for showing on the display. When shown on the display, however, the image data with decimated frames is apt to produce unnatural movement, as in the example case of displaying an object moving at a constant speed. Such unnaturalness takes the shape of so-called saccadic movement or jerkiness in movement.

With reference to FIG. 1, the mechanism of causing jerkiness is explained. FIG. 1 is a drawing to explain about the mechanism on how the deterioration in motion of image, as is commonly called "jerkiness," is generated.

It is assumed that a high-speed reproduction is made of temporally successive frames 1 through 12 shown in FIG. 1(a). Each of the frames 1 through 12 includes a moving object 11. This moving object 11 moves downward as the frame changes to new one after another from 1 toward 12. FIG. 1(b) is a drawing of only the vertical lines of the image region including the object 11 laid out in the order of frames 1 to 12. One vertical cell means one pixel. The moving object 11 moves downward by one pixel for each frame-to-frame transfer.

When this image data is reproduced at a high speed, decimation of frames is executed. It is assumed here that frames 3, 6, 9, and 12 be omitted at the time of reproduction. The reproducing speed will become 1.5 times (3/2 times) as much. Thus, the image reproduced will be made up like 1, 2, 4, 5, 7, 8, 10, and 11 in the order of frames, while frames 3, 6, 9, and 12 are not reproduced.

As is understandable from FIG. 1(c), the moving object 11 moves by one pixel between the reproduced frames 1 and 2, but it moves by 2 pixels between the reproduced frames 2 and 4. In a high-speed reproduction, reproduction processing is carried out at even intervals in terms of time and in the order of frames 1, 2, 4, 5, 7, 8, 10, and 11. As a result, viewers will observe that the moving object 11 will show an unnatural behavior of repeating quick and slow movements. This is the phenomenon so-called "jerkiness" meaning that the object displayed will show jerky motions here and there. The main cause for generating jerkiness lies in the decimation processing of reproduction frames.

Some ideas have been presented concerning data reproduction systems in which reproducing speed is made variable. For example, Japanese patent Laid-Open publication (JP-A, hereinafter) No. 1995-303240 refers to one of such data reproduction devices, and explanation thereof is given as follows referring to FIG. 2. This data reproduction device has a data storage section 101 with HDD etc., a decoding section 102, a buffer control section 103, a buffer memory 104, an output control section 105, a display section (monitor) 106, an input section 107, and a system clock 108.

In the data storage section 101 with HDD etc., the image data as the object for reproduction is stored in the form of compressed image data such as MPEG image data. The decoding section 102 processes decoding of MPEG data, for example. The decoded data is temporarily stored in the buffer memory 104 under control of the buffer control section 103 and then outputted to the display section 106 made of LCD etc., as a monitor under control of the output control section 105.

Reproducing speed is set as desired by the user through the input section 107. The data regarding the reproducing speed setting inputted through the input section 107 is forwarded to the internal counter 109 of the decoding section 102. In the device shown in FIG. 2, a fixed clock signal is inputted from the system clock section 108 to the data storage section 101, the decoding section 102, the buffer control section 103, the buffer memory section 104, the output control section 105, and the display section 106, and thus, the inputted clock signal is to control timings of processing at each section.

The clock 109 in the decoding section 102 counts the value of the counter operating on the clock supplied by the system clock 108. Based on this value of the counter, the timing of the processing to be executed is defined. In the case of MPEG2, for example, the packet the image data is stored in is provided with a time stamp that specifies the timing of processing. For example, PTS (Presentation Time Stamp), DTS (Decoding Time Stamp), SCR (System Clock Reference), etc., are adopted, each being described by the time unit of 90 kHz clock pulse. The specification for each of PTS, DTS, or SCR is set for 33-bit description to fit for 24 hours, but for the clock actually used in the decoder, a lower-bit counter (for example, a 32-bit counter) may as well be applied.

The clock 109 in the decoding section 102 counts the value of the counter operating on the clock pulse supplied by the system clock 108 to decide on the timing of processing to be executed in the decoding section 102 and carry out decoding processing. By such control of processing timing, adjustment is made of the output time for the video and audio data to be outputted from the decoding section 102.

The decoded image data outputted from the decoding section 102 is temporarily stored in the buffer memory 104 under control of the buffer control section 103 and then outputted to the display section 106 made of LCD etc., as a monitor under control of the output control section 105. Each of these sections has the processing timings defined by the clock pulse supplied from the fixed system clock 108 to execute processing.

The frame data to be outputted from the decoding section 102 is to be outputted according to the timings specified in the reproducing speed setting data inputted at the input section 107. But the processing timings at the buffer control section 103, the buffer memory 104, the output control section 105, and the display section 106 are defined by the clock pulse supplied by the system clock 108 which is a fixed clock pulse not to be changed irrespective of reproducing speed. Therefore, even if the frame data to be outputted from the decoding section 102 is outputted at shorter intervals than normal, processing at the buffer control section 103, the buffer 104, the output control section 105, and the display section 106 can be conducted only at the same timings as the normal reproducing processing. For example, processing is conducted according to a frame rate of 60 frames a second, that is, the normal speed of reproduction.

Therefore, it happens that processing speed cannot keep pace with the full number of frames to be outputted from the decoding section 102, resulting that the display will be made up of not all the image frames but with some frames lacking at intervals. Consequently, the high-speed reproduction data to be shown on the display section 106 will turn out to be an image with which some jerkiness mingles together, as explained above in reference to FIG. 1.

JP-A-2004-56761 includes an embodiment disclosing how to solve the problem of jerkiness. Disclosed in this JP-A-2004-56761 is a reproduction system that has a configuration to supply a variable system clock pulse to an output control section executing output control for image data to be sent to a display section.

As shown in FIG. 3, the above reproduction system includes a data control section 101 with HDD etc., a decoding section 102, a buffer control section 103, a buffer memory section 104, an output control section 105, a display section 106, an input section 107, and a system clock 108. In FIG. 3, the same sections as appearing in FIG. 2 are shown given with the same reference numbers. The configuration shown in FIG. 3 further includes a variable system clock 111 for supplying the clock pulse to the output control section 105, and a buffer memory 112 attached to the output control section 105.

The data storage section 101 made of HDD etc., stores the image data as the object for reproduction in the form of compressed image data such as MPEG image data. The decoding section 102 carries out, for example, MPEG data decoding processing. The decoded data, after temporarily stored in the buffer memory 104 under control of the buffer control section 103, is outputted to the display section 106 as a monitor and made of LDC etc., under control of the output control section 105.

In the configuration shown in FIG. 3, a variable clock is inputted to the output control section 105 that performs output control for the image frame data to be outputted to the display section 106. This enables the timings variable, namely the timings of inputting image frame data to the output control section 105 and also of outputting image frame data from the output control section 105 to the display section 106. In order to adjust input and output of data in case of any disagreement of timings, there is provided the output control section buffer memory 112 in which it is made possible to keep a buffering accumulation of data in case the input data is excessive as compared to the output data.

The above configuration permits the output control section 105 to do processing according to its own variable system clock 111 and also to alter reproduction frame rate at the display section 106. For example, it becomes possible to display image not only at a normal frame rate of 60 frames per second but also at a faster frame rate such as 90 frames per second.

If display is made at such a frame rate, high-speed reproduction does not necessarily require decimation of frames as explained hereinabove with reference to FIG. 1, but it becomes possible to display all the image frames at shorter time intervals than the intervals of a normal reproduction. As a result, the problem of jerkiness arrives at a solution.

The configuration shown in FIG. 3, however, requires that the output control section buffer memory 112 be provided for data output and input adjustment at the output control section 105.

Further in the case of the configuration shown in FIG. 3, changing the reproducing speed while a certain moving image content is being reproduced at a certain reproducing speed, for example, will entail change in setting of the supply clock of the variable system clock 111. In this case, only the input clock to the output control section 105 is to be changed necessitating synchronizing the input clock to the sections preceding to the output control section 105 with the changed clock to the output control section 105, and since a time-lag takes place as it takes time to execute such synchronization, there occur such problems that the processing at the output control section 105 is obliged to halt temporarily and that the display processing at the display section 106 is also compelled to be interrupted.

SUMMARY OF THE INVENTION

The present invention has been made in view of the above-mentioned problems, and there is a need for providing a data reproduction system, a data reproducing method, and a computer program capable of reproducing high-quality image while preventing jerkiness from occurring in the course of reproduction processing in which a reproducing speed is continuously varied in the time-axial direction, as in the case of high-speed reproduction, for example.

A first aspect of the present invention is directed to a data reproduction system for content reproduction that may include: a reproducing speed determining section that, based on a content reproducing speed, controls a clock pulse outputted from a system clock, making a clock frequency higher according as the content reproducing speed ascends and making the clock frequency lower according as the content reproducing speed descends; a system clock output section that outputs variable clock signal having a frequency controlled by the reproducing speed determining section; and content reproduction processing section that receives input of the variable clock signal outputted from the system clock and carries out data processing at a processing speed according to the inputted variable clock signal. The content reproduction processing section is capable at least of acquiring the data of a reproducing object stored in a buffer memory and releasing such acquired data to a display section with processing speed kept variable according to the variable clock signal inputted from the system clock.

In the data reproduction system of one embodiment according to the first aspect, the reproducing speed determining section may control clock frequency, if the content reproducing speed is set to be n times as fast as a standard reproducing speed, making the clock frequency of the variable clock to be set to be n times as fast as the clock frequency at the time of the standard reproduction.

In the data reproduction system of another embodiment according to the first aspect, the content reproduction processing section may include: a data storage section, a decoding section, a buffer control section, an output control section, and an output display section. All of these sections may receive input of variable clock signal outputted from the system clock and execute data processing with the processing speed kept variable according to such inputted variable clock signal.

In the data reproduction system of another embodiment according to the first aspect, the content reproduction processing section may include: a data storage section, a decoding section, a buffer control section, an output control section, and an output display section. The buffer control section, the output control section, and the output display section may receive the variable clock signal outputted from the system clock and carry out the processing after the processing of data readout from the buffer memory controlled by the buffer control section, while processing speed being kept variable according to the variable clock signal. The data storage section, the decoding section, and the buffer control section may receive a fixed clock signal of a fixed frequency and carry out the processing before the processing of write data into the buffer memory controlled by the buffer control section at a fixed processing speed according to the fixed clock signal.

In the data reproduction system of another embodiment according to the first aspect, the frequency of the fixed clock signal may be set at a frequency higher than the frequency of the clock signal that has the frequency highest among the variable clock signals outputted from the system clock.

In the data reproduction system of another embodiment according to the first aspect, the reproducing speed determining section may determine the speed of content reproduction based on the user-established data inputted through the input section and, further, on the basis of such speed of reproduction as determined, determine the clock frequency to be outputted from the system clock.

In the data reproduction system of another embodiment according to the first aspect, the reproducing speed determining section may receive input of feature quantity data of the object content to be reproduced, determine the content reproducing speed based on such feature quantity data, and on the basis of such reproducing speed as determined, determine the clock frequency to be outputted from the system clock.

A second aspect of the present invention is directed to a data reproducing method for content reproduction that may include: a clock frequency control step to control a clock pulse outputted from a system clock according to a content reproducing speed, increasing the clock frequency following an ascent of a content reproducing speed while lowering the clock frequency following a descent of the content reproducing speed; a system clock output step to output from the system clock a variable clock signal having a frequency controlled in the clock frequency control step; and a content reproduction processing step to receive input of variable clock signal outputted from the system clock and to carry out data processing at a processing speed according to the inputted variable clock signal. The content reproduction processing step may acquire at least the data of reproducing object stored in the buffer memory and release such acquired data to the display section with the processing speed kept variable according to the variable clock signals inputted from the system clock.

In the data reproducing method of one embodiment according to the second aspect, the clock frequency control step may carry out control of clock frequency, if the content reproducing speed is set to be n times the standard reproducing speed, making the clock frequency of the variable clock to be set n times the clock frequency at the time of standard reproduction.

In the data reproducing method of another embodiment according to the second aspect, the content reproduction processing step may include: acquiring processing of data from the data storage section; decoding processing at the decoding section; processing of writing and reading decoded data to and from the buffer memory at the buffer control section; display control processing at the output control section; and data display processing at the output display section. All these steps of processing may be carried out while receiving the input of the variable clock signal outputted from the system clock and varying the processing speed according to the inputted variable clock signal.

In the data reproducing method of another embodiment according to the second aspect, the content reproducing processing step may include: acquiring processing of data from the data storage section, decoding processing at the decoding section, processing of writing and reading decoded data to and from the buffer memory at the buffer control section, display control processing at the output control section, and data display processing at the output display section. The buffer control section, the output control section, and the output display section may receive the input of the variable clock signal outputted from the system clock and carry out the processing after the processing of data readout from the buffer memory controlled by the buffer control section, while varying processing speed according to the variable clock signals. On the other hand, the data storage section, decoding section, and buffer control section may receive the input of the fixed clock signal of a fixed frequency and carry out the processing before the processing of writing data into the buffer memory controlled by the buffer control section at a fixed processing speed according to the fixed clock signal.

In the data reproducing method of another embodiment according to the second aspect, the frequency of the fixed clock signal is set at a frequency higher than the frequency of the clock signal that has the frequency highest among the variable clock signals outputted from the system clock.

In the data reproducing method of another embodiment according to the second aspect, the clock frequency control step may determine the speed of content reproduction based on the user-established data inputted through the input section, and, further, on the basis of such speed of reproduction as determined, determine the clock frequency to be outputted from the system clock.

In the data reproducing method of another embodiment according to the second aspect, the clock frequency control step may include: receiving input of feature quantity data of the object content to be reproduced, determining the content reproducing speed based on such feature quantity data, and determining the clock frequency to be outputted from the system clock on the basis of such reproducing speed as determined.

A third aspect of the present invention is directed to a computer program by which content reproduction processing is made operable in a data reproduction system, that may include: a clock frequency control step to control clock pulse to be outputted from a system clock conforming to the content reproduction speed, increasing the clock frequency higher following the ascent of the content reproduction speed while decreasing the clock frequency lower following the descent of content reproduction speed; a system clock output step for outputting from the system clock a variable clock signal controlled at the clock frequency control step; and a content reproduction processing step to receive the input of the variable clock signal outputted from the system clock and to carry out data processing at a processing speed conforming to the inputted variable clock signal; the content reproduction processing step carrying out at least the processing to acquire the data of the reproducing object stored in the buffer memory and to release such acquired data to the display section with processing speed kept variable according to the variable clock signal inputted from the system clock.

The computer program according to the third aspect of the present invention is not like a computer system that can execute various program codes, for example, but is a computer program providable in a computer-readable form, for example, in recording media such as CD, FD, MO, etc., and/or communication media such as network. By making such programs available in a computer-readable form, it becomes realizable to do processing on a computer system according to the programs.

Further points, in which the present invention is desired, featured, and merited, are going to be clarified by virtue of more detailed explanation supported by embodiments of this invention described hereinafter and accompanying drawings. Meanwhile, what is called "system" in this specification means logical assembly formation of a plurality of devices and does not necessarily imply that each component device is housed in the same cabinet.

According to these aspects and embodiments of the present invention, it is possible to choose the following formation of processing:

output is obtained from the system clock as the result of executing the control that the clock frequency is increased following ascent of the content reproduction speed and the clock frequency is decreased following descent of the content reproduction speed;

the variable clock signal outputted from the system clock is inputted to each section relating to the execution of the data processing for content reproduction, viz., the data storage section, the decoding section, the buffer control section, the output control section, and the output display section;

and such processing as data acquirement at the data storage section, decoding at the decoding section, writing and reading decoded data to and from the buffer memory at the buffer control section, display control at the output control section, and display at the output display section, is carried out with the processing speed being varied conforming to the clock signal of a frequency corresponding to the content reproduction speed.

Such a formation of processing as abovementioned makes it possible to provide all-frame display, that is, display without decimation of frames, with a variable speed even during a high-speed reproduction, leading to realization of high-quality image reproduction without jerkiness.

BRIEF DESCRIPTION OF THE DRAWING

Embodiments of the present invention will be described in detail based on the following figures, wherein:

FIG. 2 is an example of block diagram of a data reproduction system in the past;

FIG. 6 is an illustration to explain about specific examples of the clock pulse to be inputted from a system clock to a data storage section and an output display section;

FIG. 10 is an illustration to explain about input and output of an output control section in the processing to which a variable system clock in a data reproduction system according to an embodiment of the present invention is applied;

FIG. 11 is an illustration to explain about input and output of an output control section in the processing to which a variable system clock is not applied;

FIG. 12 is an illustration to explain about transition of reproducing speed in case processing for change is made of a clock cycle outputted from a system clock;

FIG. 15 is a block diagram showing an example of a data reproduction system according to an embodiment of the present invention, in which the input clock to a buffer control section, an output control section, and an output display section is set to be variable corresponding to reproducing speed.

DETAILED DESCRIPTION OF THE PREFERRED EMBODIMENTS

Detailed description is given hereinbelow concerning the data reproduction system, the data reproducing method, and the computer program of the present invention with reference to the accompanying drawings.

Figure 4:
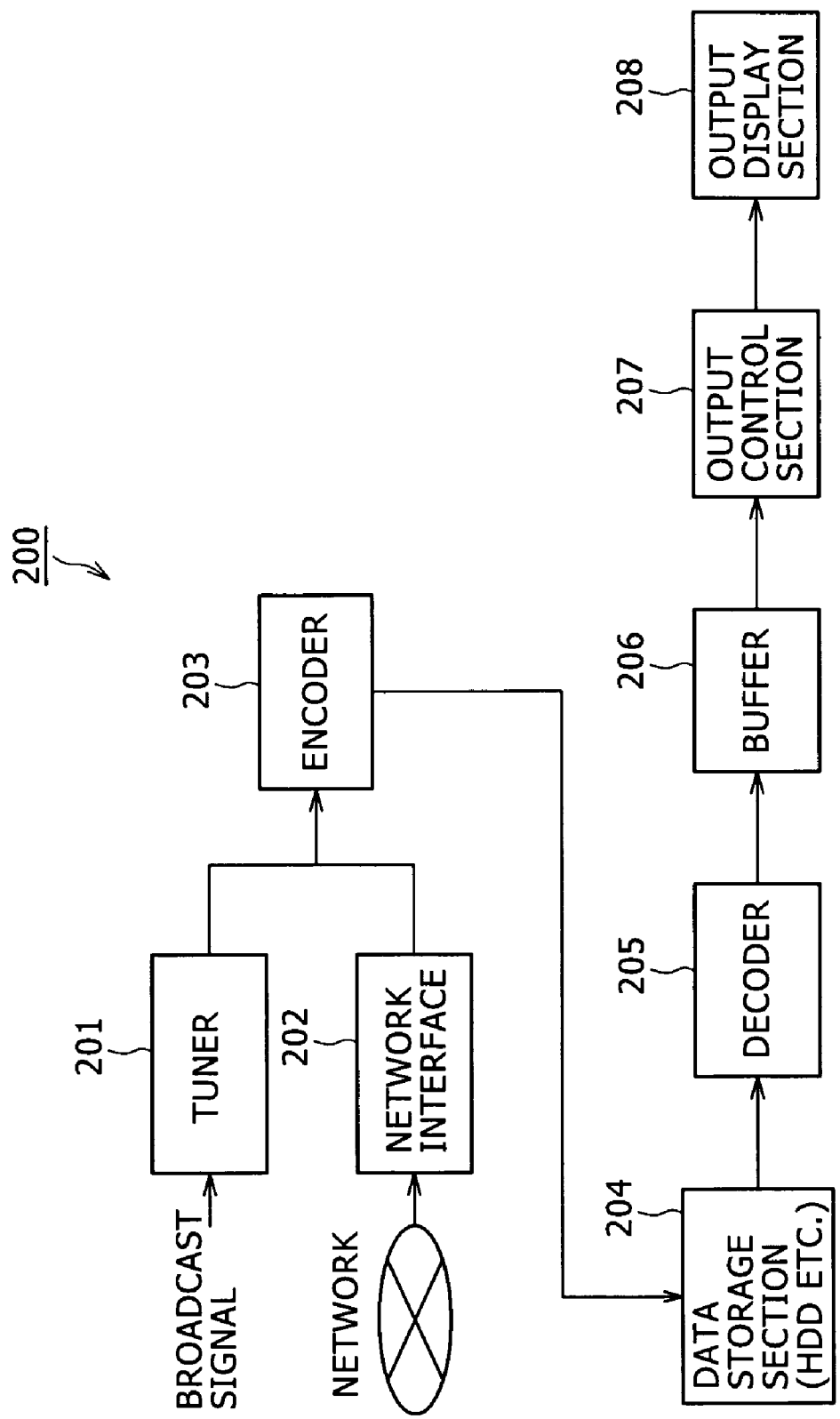
FIG. 4 is a block diagram of a data reproduction system according to an embodiment of the present invention.

Referring to FIG. 4 to begin with, explanation is made concerning the configuration of a data reproduction system according to an embodiment of the present invention. The data reproduction system 200 is a data reproduction system to perform reproduction processing of the content inputted, for example, from a broadcast or network, or the content stored in data recording media such as DVDs and hard discs. The overall and fundamental configuration of the data reproduction system 200 according to an embodiment of the present invention is similar to that of a data reproduction system in the past such as represented by a VTR and an HDD recorder.

One thing in which the data reproduction system 200 according to an embodiment of the present invention is different from a like system in the past is that within the data reproduction system, it is configured to carry out the data processing for content reproduction with a variable clock applied to. Such variable clock is set in a variety of clock cycles so as to correspond with different speeds of content reproduction, thereby controlling the processing timing of each and every section in charge of data processing included in the data reproduction system 200. With the above processing, reproduction of moving image free from jerkiness becomes possible even when reproduction processing is conducted at a high speed while reproducing speed is varied incessantly in the time-axial direction. More concretely, the data reproduction system 200 has a configuration to be able to control the clock pulse outputted from the system clock corresponding to the speed of content reproduction in such a way that the clock frequency is increased in response to the ascent of the content reproducing speed and decreased in response to the descent of the content reproducing speed.

Explanation is given here concerning the configuration of the data reproduction system 200 shown in FIG. 4. The content distributed by radio wave or broadcast wave is inputted through the tuner 201, and the content distributed by the Internet, LAN, and other networks is inputted through the network interface 202. Such inputted content goes through the encoder 203 where encoding processing is made of the content in line with the forms of MPEG etc. In case the inputted content is already encoded, the encoding processing at the encoder 203 will be dispensed with.

The encoded content is to be stored in the data storage section 204 which is operable with a hard-disc, for example. Processing up to this point covers up to recording of inputted content such as broadcast content. Each section in charge of processing of data storage receives input of the system clock (for example, 13.5 MHz) of the data reproduction system 200, and carries out the processing on the inputted clock cycle to finalize normal processing of recording content.

Next, explanation is made concerning the processing of reproduction of the content stored in the data storage section 204 operable with a hard-disc, for example. The data read out from the data storage section undergoes decoding processing at the decoder 205. For example, decoding processing is made in accordance with the forms of MPEG, NTSC, MUSE, etc.

As the result of decoding processing, the decoder 205 outputs image and sound data. The outputted data is deployed in the buffer 206 and then transferred to the output control section 207. The buffer 206 may well be configured to be built in the decoder 205. To the image and sound data, the output control section 207 appends any other data the output display section 208 may find useful, such as a synchronizing signal, and outputs it to the output display section 208 having a display and a speaker.

The output display section 208 shows the inputted signals in a visuoauditory form. For example, the output display section 208 has a CRT, LED, or plasma display, by which the image signal is presented in a form for persons to be able to view; and it also has an amplifier and speaker by which sound signal is presented in a form for human ears to be able to listen to.

In the above, explanation has been given regarding the outline of the system by which content of broadcast etc., is recorded and reproduced in a visuoauditory form. The basic configuration of the system is equivalent to one in the past. One thing in which the data reproduction system 200 according to an embodiment of the present invention is different from a like system in the past is that, as mentioned above, the system is configured to carry out the data processing for content reproduction with a variable clock applied to. Such variable clock is set in a variety of clock cycles so as to correspond with different speeds of content reproduction, thereby controlling the processing timing of each and every section in charge of data processing included in the data reproduction system 200. With the above processing, it becomes possible to carry out reproduction of moving image free from jerkiness.

Figure 5:
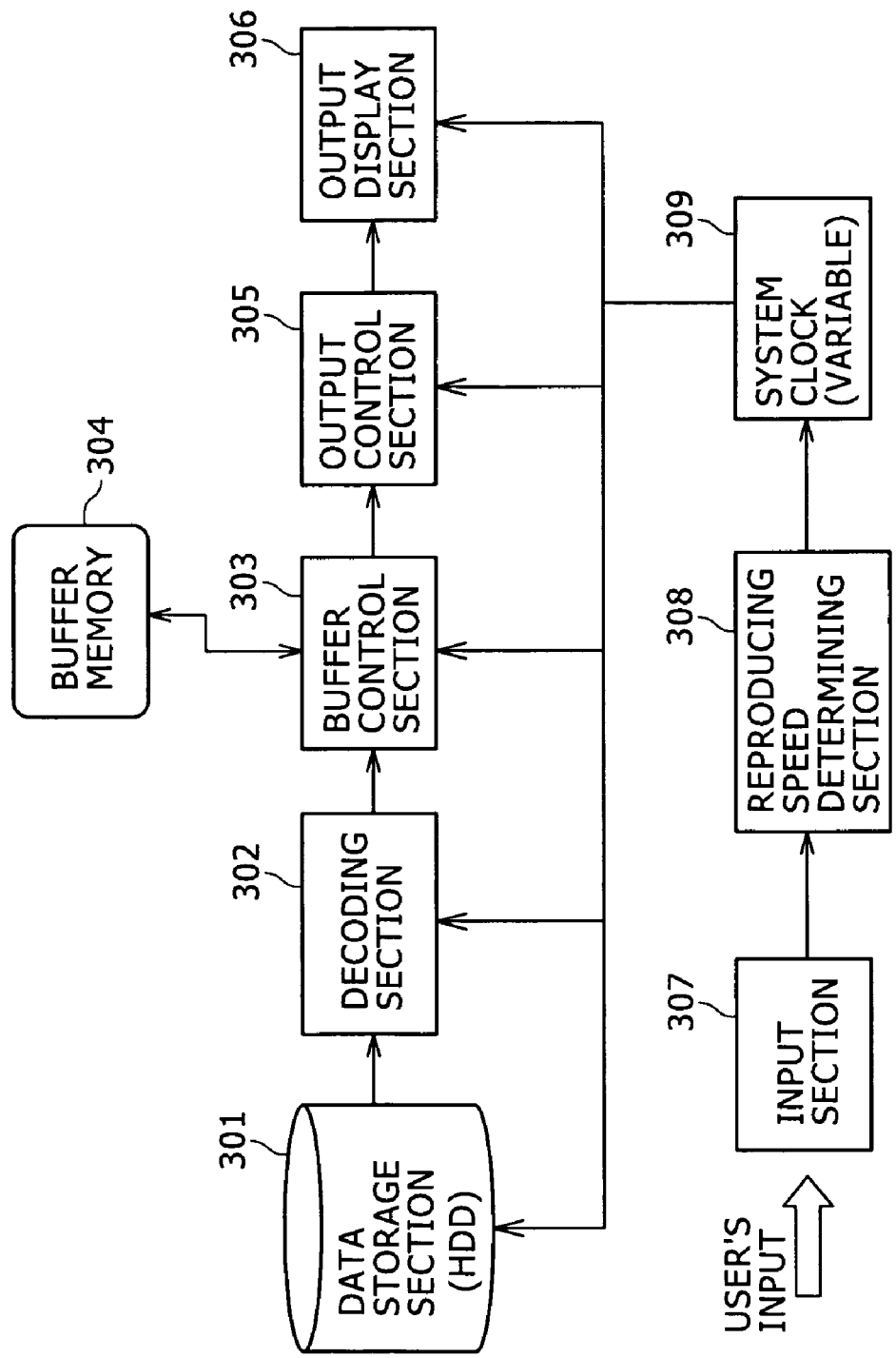
FIG. 5 is a block diagram showing a configuration for processing of content reproduction in a data reproduction system according to an embodiment of the present invention.

With reference to FIG. 5, explanation is made concerning the embodiments of processing configuration for content reproduction in the data reproduction system 200 of the present invention which has enabled reproduction of moving image free from causing jerkiness. The core flow of content reproduction is, as explained in reference to FIG. 4, follows the steps of processing; that is, starting from acquirement of data from the data storage section, decoding processing by the decoder, and outputting of image and sound obtained from decoding.

The content reproduction processing section which carries out data processing concerning processing of content reproduction include the data storage section 301, the decoding section 302, the buffer control section 303, the output control section 305, and the output display section 306, and these processing sections are to take charge of executing actual processing in relation to content reproduction. In other words, in FIG. 5, the content stored in the data storage section 301 which is made up with a hard-disc etc., is processed for decoding at the decoding section 302. For example, decoding processing in accordance with the forms of MPEG, NTSC, MUSE, etc., is carried out.

As the result of decoding processing, the decoding section 302 outputs image and sound data to the buffer control section 303, and the buffer control section 303 has the buffer memory 304 store the image and sound data. Then, the output control section 305 accepts input of the data stored in the buffer memory from the buffer control section 303. To the image and sound data, the output control section 305 appends any other data the output display section 306 may find useful, such as a synchronizing signal, and outputs it to the output display section 306 having displays and speakers.

In the content reproduction, the reproducing speed can choose a setting of a normal reproduction or a regular reproducing speed; besides the foregoing, setting at high-speed reproduction, slow reproduction, or other various forms of setting can be chosen. Such setting can be made by users' input through the input section 307 shown in FIG. 5. The reproducing speed determining section 308 determines a reproducing speed based on users' input through the input section 307 and, according to the determined data, adjusts the clock frequency of the system clock 309. The system clock 309 has such configuration as to be able to keep the clock frequency variable.

For example, assuming that the clock frequency of the system clock 309 at the time of normal reproduction is 13.5 MHz, and if visuoauditory reproduction of content is set at 1.5× speed, the reproducing speed determining section 308 is to set the clock frequency of the system clock 309 as follows.

$$13.5 \times 1.5 = 20.25 \text{ MHz}$$

In this way, the reproducing speed determining section 308 controls the clock pulse outputted from the system clock 309 in accordance with the content reproducing speed and performs clock frequency control by which the clock frequency is led to be set higher as the content reproducing speed ascends. Thus the system clock 309 is to output a variable clock signal of a frequency controlled in response to reproducing speed at the reproducing speed determining section 308.

When, for example, the content reproducing speed is set to be n times the standard reproducing speed, the reproducing speed determining section 308 carries out the processing of clock frequency control so that the clock frequency of the variable clock outputted from the system clock 309 may be set to be n times the clock frequency at the time of standard reproduction.

The system clock 309 outputs a variable clock signal that has a frequency set in proportion to the content reproducing speed, to the data processing sections (the data storage section 301 to the output display section 306) to carry out data processing relating to the content reproduction. Each data processing section (the data storage section 301 to the output display section 306) is to follow the clock frequency inputted from this system clock 309 and vary the processing speed accordingly to execute data processing.

The abovementioned may be summarized as follows.
(a) At the time of normal reproduction:
for example, the clock frequency of the system clock 309 is 13.5 MHz, and the data storage section 301 to the output display section 306 carry out data processing according to the clock frequency of 13.5 MHz.

(b) At the time of 1.5× high-speed reproduction:
the clock frequency of the system clock 309 is set as 13.5×1.5=20.25 MHz, and the data storage section 301 to the output display section 306 carry out data processing according to the clock frequency of 20.25 MHz.

As above, the data reproduction system shown in FIG. 5 according to an embodiment of the present invention gives input of a variable clock signal having a frequency proportional to the content reproducing speed to the data storage section 301 to the output display section 306, these sections being in charge of carrying out data processing relating to the content reproduction processing, and makes those processing sections carry out data processing while varying processing speed in accordance with the clock frequency changing in proportion to the content reproducing speed.

Therefore, assuming that the frame rate of the image to be outputted to the display from the output display section 306 is, for example, 60 frames/sec at normal reproduction, the frame rate in the case of reproduction at 1.5× speed will be 90 frames/sec, permitting image display to be realized without decimation of frames.

In this way, the data of the clock having a clock frequency variable in proportion to an image reproducing speed is sent to each section in charge of carrying out the processing relating to the content reproduction, so that all stages from readout of data to presentation may be operated at the speed corresponding to the speed of content reproduction.

For example, in case the user input specifies the content reproducing speed to be a high-speed reproduction, the reproducing speed determining section 308 exercises control so that the clock frequency outputted from the system clock 309 may be set high, and the system clock 309 outputs a clock signal thus set to be high frequency. The variable clock signal outputted from the system clock 309 is to be inputted to the content reproduction processing section.

As described above, the content reproduction processing section specifically includes the data storage section 301, decoding section 302, buffer control section 303, output control section 305, and output display section 306, and each of these processing sections receives input of variable clock signal having a frequency proportional to the content reproduction speed. As a result, processing speed will be varied in accordance with the clock signal having the frequency corresponding to the content reproducing speed, for the following processing: acquirement of data from the data storage section 301; decoding processing at the decoding section 302; processing of writing and reading decoded data to and from the buffer memory at the buffer control section 303; display control processing at the output control section 305; and data display processing at the output display section 306.

By the above processing, even in the case of high-speed reproduction of content, for example, it is possible to realize high-speed display of all frames, that is without decimation of frames and reproduce high-quality image free from jerkiness.

In the present example of configuration, since the system clock 309 that supplies clock data to the data processing sections (the data storage section 301 to the output display section 306) performing data processing in connection with content reproduction, exists as an independent system clock, the timing of change when such change in clock frequency is made, can be inputted simultaneously to all the sections concerned with reproduction and, therefore, can give the effect of change in operational cycle to the related processing sections all at the same time. Changing the reproducing speed in the middle of viewing is also possible while viewing is continued without causing any interruption in reproduction.

Referring to FIG. 6, explanation is made in regard to specific examples of the clock pulse to be inputted from the system clock 309 to the data storage section 301 to the output display section 306. FIG. 6 is an illustration showing specific examples of the clock frequency that the system clock 309 inputs to the data storage section 301 to the output display section 306. FIG. 6 shows the examples of the clock in correspondence to the following three kinds of content reproducing speed.

(a) 1.00× speed (normal reproduction)
(b) 1.50× speed (high-speed reproduction)
(c) 0.75× speed (low-speed reproduction)

Each of (a), (b), and (c) indicates the same number of clock pulses (n clock pulses). The time taken to count the number of clock pulses for each of (a), (b), and (c) is as follows:

(a) 1/60 second at 1.00× speed (normal reproduction)
(b) 1/90 second at 1.50× speed (high-speed reproduction)
(c) 1/45 second at 0.75× speed (low-speed reproduction)

Figure 7:
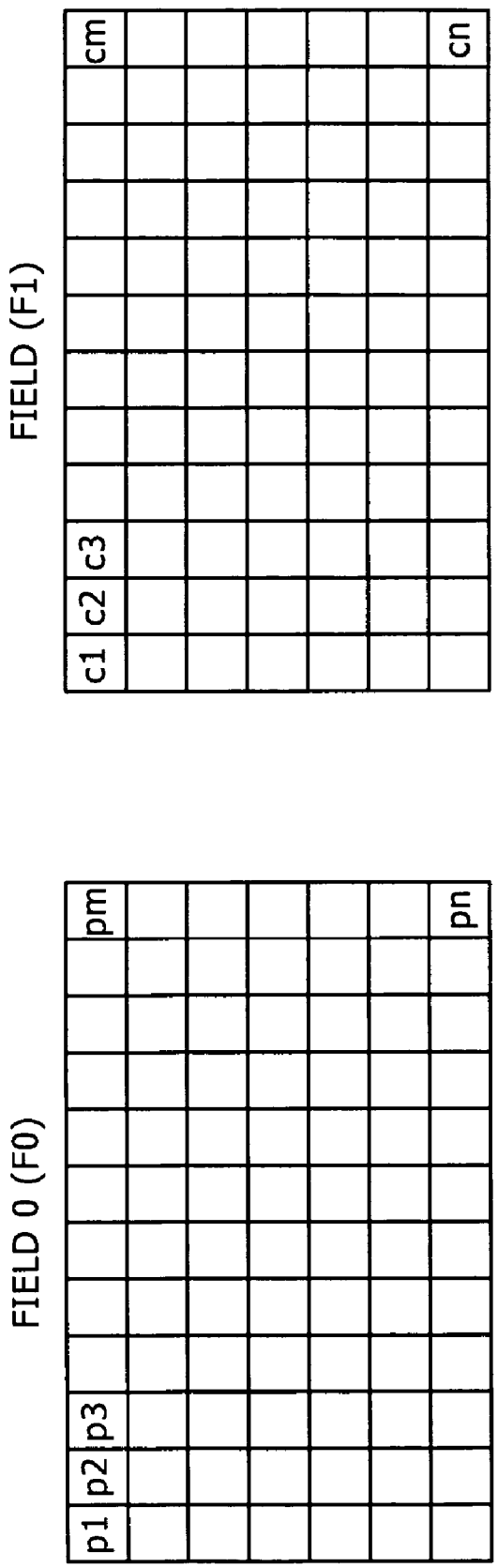
FIG. 7 is an illustration showing an example of 2 sets of field data making up a frame.

The number of clock pulses [n] shown in FIG. 6 is equal to the number of clock pulses required for processing of one field data. One frame, namely, one screenful of image data includes two fields. One frame is made up by combining two sets of field data or image data; each set including alternate horizontal lines (interlaced processing). That is to say, two sets of field data make up one frame. FIG. 7 shows an example of two sets of field data to make up one frame.

One frame of image is made up, for example, with Field 0 (F0) and Field 1 (F1) as shown in FIG. 7. Field 0 (F0) shown in FIG. 7 is made up of n pixels, from p1 to pn. Field 1 (F1) is also made up of n pixels, from c1 to cn.

When data processing is carried out at the clock cycle (a) in FIG. 6, it is assumed to be called as normal reproducing speed, viz., the clock frequency at the time of 1.00× speed viewing. In this case, the field cycle is 1/60 second, meaning that it takes 1/60 second to transfer one field-full of data. Assuming that a processing time for one clock pulse is set for each of pixel [n] included in one field, and that
processing is done at 1.00× speed normal reproduction, a clock frequency, which means [n] clock pulses set in 1/60 second, the time period required for transferring one field-full of data, is set in the system clock 309, from which the clock signal is inputted to the data storage section 301 to the output display 306; as a result, each data processing section carries out processing of [n] pixels or one field-full of image data in cycles of 1/60 second.

More specifically, in case the image has a field including 858 horizontal lines by 262.5 vertical lines and field cycles of 59.94 Hz, the clock frequency becomes 13.5 MHz at 1.00× normal speed reproduction processing.

Assume here that the content reproducing speed is set at 1.50× high-speed reproduction and that the number of clock pulses for a cycle of 1/90 second remains to be [n] clock pulses. Accordingly, the clock frequency will become as fast a speed as proportionate to the content reproducing speed, namely 1.50 times faster in comparison with the frequency at the time of 1.00× speed. In other words, the system clock 309 is to set the clock signal of the clock frequency having the clock cycle (b) shown in FIG. 6, where the illustration means that [n] clock pulses are set in 1/90 second, this time span being equal to the time required for transferring one field-full of data; then, this clock signal is inputted to the data storage section 301 to the output display section 306, and these data processing sections are to carry out processing of one field-full or [n] pixels of image data in cycles of 1/90 second.

On the other hand, in the case of slow reproduction where the content reproducing speed is slowed down to 0.75× speed, the time for transferring the field data is set to be 1/45 second. In this case, the system clock 309 is to set the clock signal of the clock frequency having the clock cycle (c) shown in FIG. 6, where the illustration means that [n] clock pulses are set in 1/45 second, this time span being equal to the time required for transferring one field-full of data; then, this clock signal is inputted to the data storage section 301 to the output display section 306, and these data processing sections are to carry out processing of one field-full or [n] pixels of image data in cycles of 1/45 second.

Figure 8A:
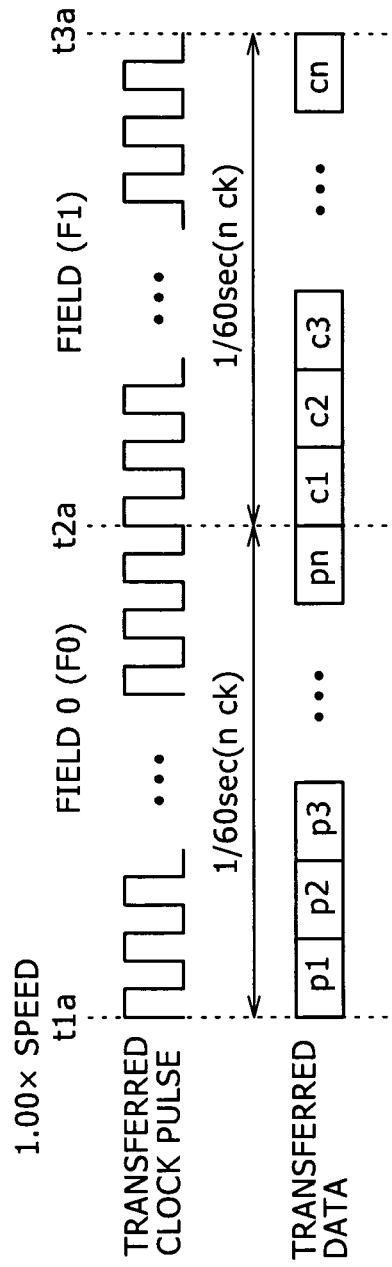
FIG. 8 is an illustration to explain about the correspondence between a clock data inputted to an output control section and a transferred data inputted from a buffer control section to an output control section.
Figure 8B:
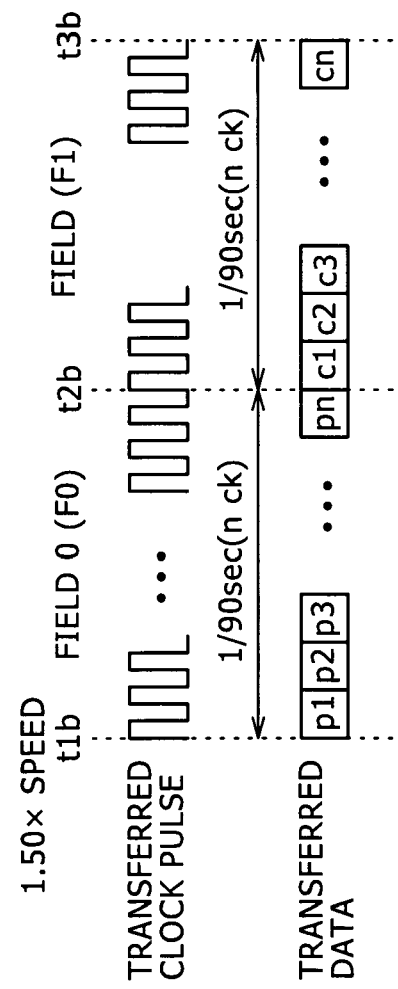

Referring to FIG. 8 and in connection with an embodiment of the present invention, explanation is given concerning the correspondence between the variable clock signal inputted to the output control section 305 shown in FIG. 5 and the transferred data inputted to the output control section 305 from the buffer control section 303. FIG. 8 shows the following two examples.

(a) 1.00× speed (normal reproduction)
(b) 1.50× speed (high-speed reproduction)

FIG. 8 illustrates how, in reproduction processing at these different reproducing speeds shown, the clock data inputted to the output control section 305 are corresponding to the transferred data inputted to the output control section 305 from the buffer control section 303.

As explained in relation to FIG. 6 (a), the reproduction processing at 1.00× speed (normal reproduction) shown in FIG. 8 (a) proceeds as follows: the clock signal of a frequency having [n] clock pulses in 1/60 second is inputted to the output control section 305; to this output control section 305, [n] pixels or one field-full of image data are also inputted in the time span of 1/60 second or [n] clock pulses from the buffer control section 303; then from the output control section 305, [n] pixels of image data is outputted in the time span of 1/60 second or [n] clock pulses to the output display section 306.

The time period of t1a-t2a shown in FIG. 8 (a) is 1/60 second, during which [n] pixels of image data to make up the field F0, for example, are inputted to the output control section 305 from the buffer control section 303 and then outputted from the output control section 305 to the output display section 306. Further, in the subsequent time period t2a-t3a of 1/60 second, [n] pixels of image data to make up the field F1 are inputted to the output control section 305 from the buffer control section 303 and then outputted from the output control section 305 to the output display section 306. By such processing, image display with field intervals of 1/60 second is realized.

In the case of reproduction processing at 1.50× speed (high-speed reproduction) shown in FIG. 8 (b), as explained in connection with FIG. 6 (b), the clock signal of a frequency having [n] clock pulses in the time span of 1/90 second are inputted to the output control section 305; also to the output control section 305, [n] pixels of image data in the time span of 1/90 second or [n] clock pulses, viz., one field-full of pixel data are inputted from the buffer control section 303; and from the output control section 305, [n] pixels of image data in the time span of 1/90 second or [n] clock pulses is outputted to the output display section 306.

The time period of t1b-t2b shown in FIG. 8 (b) is 1/90 second, during which [n] pixels of image data to make up the field F0, for example, are inputted to the output control section 305 from the buffer control section 303 and then outputted from the output control section 305 to the output display section 306. Further, in the subsequent time period t2b-t3b of 1/90 second, [n] pixels of image data to make up the field F1 are inputted to the output control section 305 from the buffer control section 303 and then outputted from the output control section 305 to the output display section 306. By such processing, image display with field intervals of 1/60 second is realized.

In any of these stages of display processing, all the data making up the frame image can be fully processed without decimation of frames. Since no decimation of frames is done, the displayed image is free from jerkiness. The reason why jerkiness is not caused is explained in reference to FIG. 9. This FIG. 9 corresponds to FIG. 1 that was used for explaining about processing of high-speed reproduction accompanied by decimation processing.

Figure 9A:
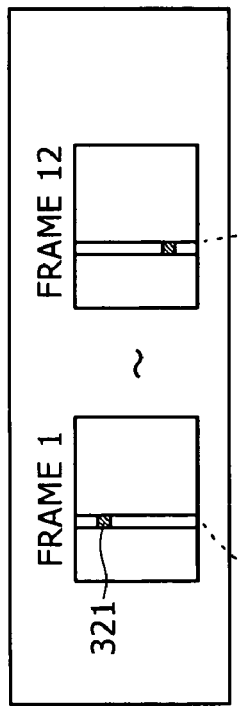
FIG. 9 is an illustration to explain about the reason why jerkiness is not caused in a data reproduction system according to an embodiment of the present invention.
Figure 9B:
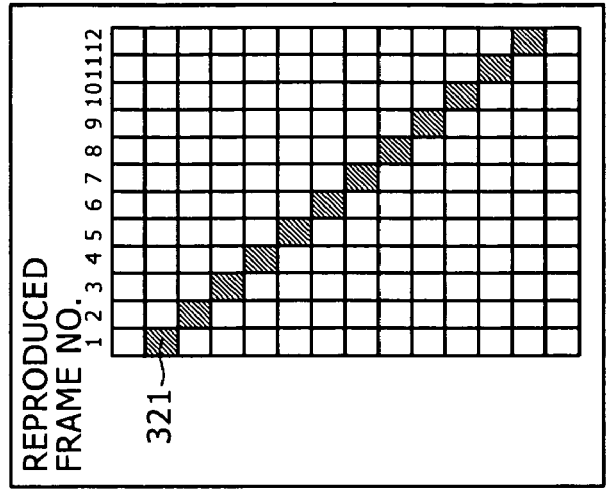
Figure 9C:
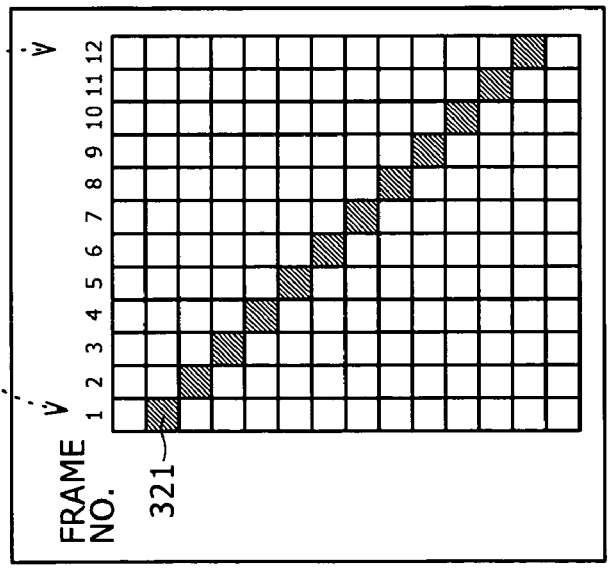
Figure 13:
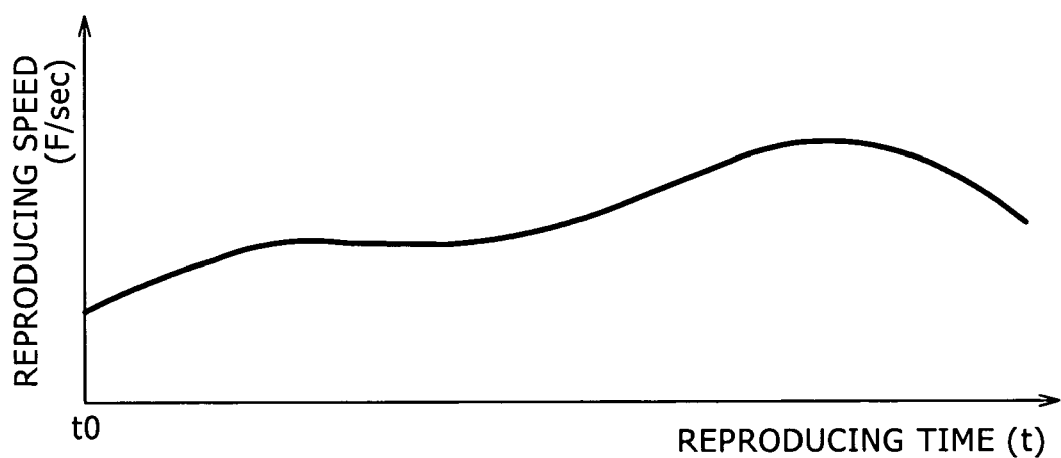
FIG. 13 is an illustration to explain about transition of reproducing speed in case processing for smooth change is made of a clock cycle outputted from a system clock.

It is assumed here that high-speed reproduction is made of temporally successive frames 1 through 12 shown in FIG. 9 (a). Each of the frames 1 through 12 includes a moving object 321. The object 321 moves downward as the frame changes to new one after another in the order of from 1 toward 12. FIG. 9 (b) shows only the vertical lines of the image region including the object 321 laid out in the order of frames from 1 to 12. One vertical cell means one pixel. The moving object 321 moves downward by one pixel for each frame-to-frame transfer.

Figure 1A:
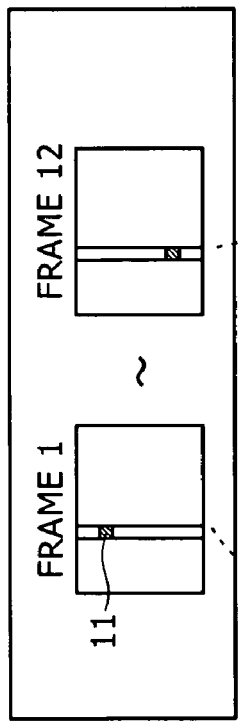
FIG. 1 is an illustration to explain about the mechanism of how jerkiness is generated.
Figure 1B:
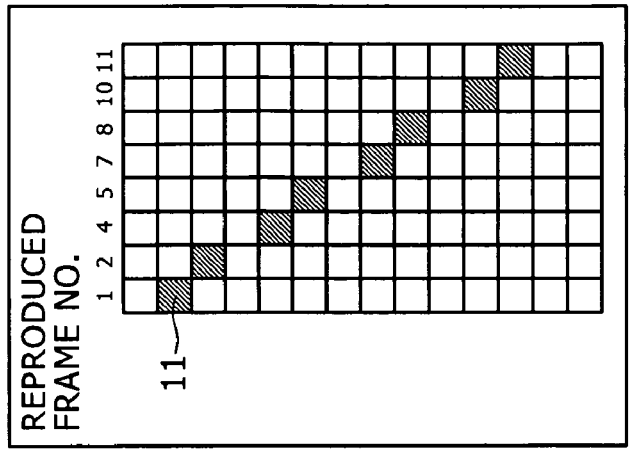
Figure 1C:
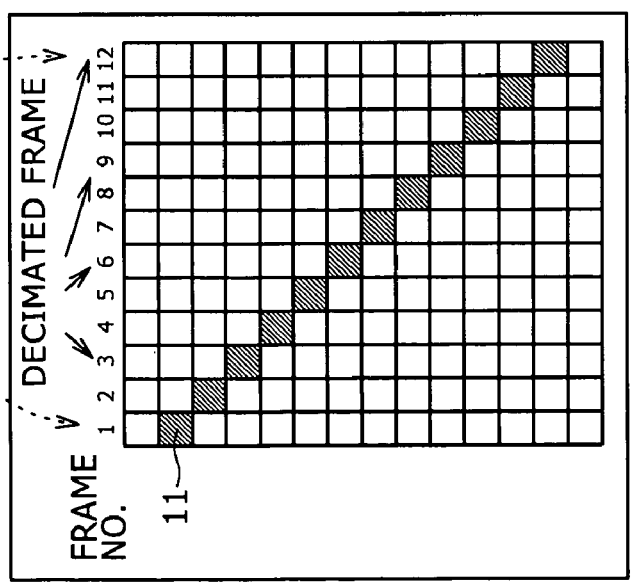
Figure 3:
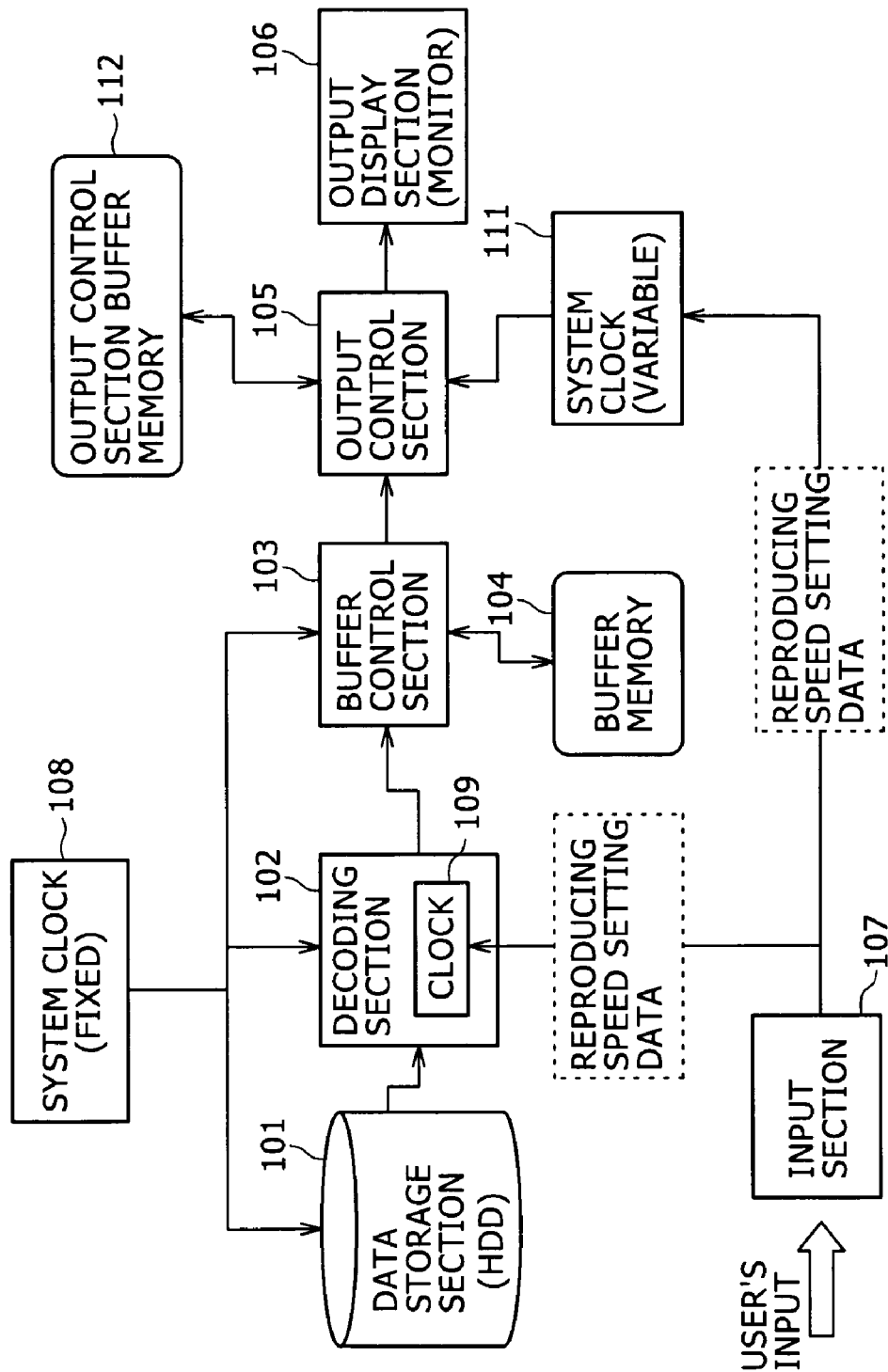
FIG. 3 is another example of block diagram of a data reproduction system in the past.

In relation to FIG. 1, decimation of frames is caused at high-speed reproduction. As explained with reference to FIG. 1 (c), the moving object moves by one pixel between the reproduced frames 1 and 2, but moves by two pixels between 2 and 4. At a high-speed reproduction, therefore, image becomes to be reproduced like 1, 2, 4, 5, 7, 8, 10, and 11 in the order of frames and at temporally regular intervals. As a result, viewers cannot help observing the object making unnatural movement like repeating too fast and too slow motions. Thus, there occurs this phenomenon characterized by the stiff and abrupt motions of the object, or so-called jerkiness.

In contrast to the above, the data reproduction system according to an embodiment of the present invention creates a variable clock signal in proportion to a reproducing speed, supplies the variable clock signal to the data processing sections in charge of processing of content reproduction, and carries out data processing in accordance with the clock frequency varied according to the content reproducing speed. As a result, processing of all the data for formulating frame image can be realized no matter whether reproduction is at high speed or at low speed without need of frame decimation processing.

Since no decimation is necessary, an example at high-speed reproduction only requires that displayed image will have displaying time of each frame shortened as shown in FIG. 9 (c), allowing each and every frame of image to be displayed in sequential order. This further produces the result that the object 321 will be shown moving without a hitch in the display in accordance with all the display frames, besides not causing any jerkiness.

With respect to the processing of input of frame data to the output control section 305 and also the processing of output of the frame data from the output control section 305 to the output display section 306, explanation is to be given by comparing the example of processing using the variable system clock according to an embodiment of the present invention with the example of processing using the fixed system clock in the past with reference to FIG. 10 and FIG. 11.

FIG. 10 shows an example of processing according to an embodiment of the present invention; the dashed line indicates the frame data inputted to the output control section 305 and the solid line indicates the frame data outputted from the output control section 305 to the output display section 306, for both the frames 1 and 2, in the case that processing of data is executed while regulated by the clock proportional to the content reproducing speed. The dashed line corresponds with the length of time for processing acquirement of data from the buffer memory 304 shown in FIG. 5. As mentioned hereinbefore, one frame is made up of two sets of field data. Item (1A) deals with the case of 1.00×-speed reproduction, while Item (1B) deals with the case of 1.50× high-speed reproduction.

In the example of processing according to an embodiment of the present invention, the clock proportional to the content reproducing speed is supplied from the system clock 308 to each of data processing sections, and each processing section carries out data processing in accordance with the clock cycle of the supplied clock signal which has a frequency proportional to the reproducing speed. Therefore, as shown in FIG. 10 (1A) and (1B), both of the frame data (expressed by dashed line) inputted to the output control section 305 and the frame data (expressed by solid line) outputted from the output control section 305 to the output display section 306 respectively can complete input and output of all pixels (n pixels) within a time span corresponding to the content reproducing speed.

FIG. 11 shows an example of processing to which the fixed system clock in the past is applied. Item (2A) stands for 1.00×-speed reproduction and Item (2B) stands for 1.50× high-speed reproduction. In the case that the fixed system clock in the past is applied to the processing, the processing at the output control section is to be operated in accordance with the clock that has the same clock cycle no matter whether at 1.00× speed reproduction or at 1.50× high-speed reproduction. When it is 1.00× speed reproduction, processing is done for each frame without a problem producing proper image display as shown in (2A).

On the other hand, in the case of 1.50× high-speed reproduction shown in FIG. 11 (2B), the time required for acquiring the data from the buffer memory to the output control section, even if processing is made by shortening the processing time for data acquirement, remains the same as the processing time in the case of 1.00×-speed reproduction, ending up that it is too short of time to fully display all frames. As a result, the output data (solid line) of the frame data from the output control section to the output display section is obliged to display the image in such a way as frames continuing 1, 2, 4 . . . with the frame 3 decimated. The abovementioned processing is just as explained hereinbefore with reference to FIG. 1, entailing that occurrence of jerkiness is unavoidable owing to decimation of frames.

As described above, the data reproduction system according to an embodiment of the present invention creates a clock signal having a frequency in proportion to a reproducing speed, supplies the clock signal to the data processing sections in charge of processing of content reproduction, and carries out data processing in accordance with the clock cycle of the clock frequency varied according to the content reproducing speed. In the consequence, processing of all the data for formulating frame image without necessitating decimation processing can be realized no matter whether reproduction is at high speed or at low speed, resulting in all-frame data display of high quality and without jerkiness.

Further in the present example of configuration, since the system clock 309 that supplies clock data to the data processing sections (the data storage section 301 to the output display section 306) performing data processing in connection with content reproduction, exists as an independent system clock, the timing of change when such change in clock cycle is made, can be inputted simultaneously to all the sections concerned with reproduction and, therefore, can give the effect of change in operational cycle to the related processing sections all at the same time. Changing the reproducing speed in the middle of viewing is also possible while viewing can be continued without causing any interruption in reproduction.

In the case that the clock frequency or the clock cycle inputted from the system clock 309 is processed for change, how the reproducing speed is to shift is explained here in reference to FIG. 12. (a) in FIG. 12 shows the clock cycle outputted from the system clock 309, and (b) shows the temporal transition of content reproducing speed in connection with changes of the clock cycle. The vertical axis denotes frame rate (frames/second) in the display section, and the horizontal axis denotes time (T).

In the time span t0-t1, the system clock 309 outputs the clock having the clock cycle outputting [n] clock pulses every 1/60 second, and in the time span t1-t2,
the system clock 309 outputs the clock having the clock cycle outputting [n] clock pulses every 1/60 second, In the time span t2-t3, the system clock 309 outputs the clock having the clock cycle outputting [n] clock pulses every 1/45 second.

According to this transition of the clock cycle, that is, changes of the clock frequency, the content reproducing speed is changed to 1.5× speed in the time span t0-t1, to 1.0× speed in t1-t2, and to 0.75× speed in t2-t3. These changes conform to the timing of changing the content reproduction. At time t1 and t2, the system clock 309 carries out processing to change the clock frequency, viz., the clock cycle, to be supplied simultaneously to the data storage section 301 to the output display section 306, and these data processing sections are able to start processing in accordance with the clock whose cycle has been changed at the same time for all the data processing sections; as the result, adjustment for synchronization of the clock cycle is no longer necessary and delay in processing is not caused. It becomes possible, therefore, to change the reproducing speed without causing interruption in reproduction of content.

Incidentally, FIG. 12 shows an example processing where three kinds of clock frequencies are outputted from the system clock 309, each frequency changing to the other by step-by-step transition. However, the clock frequency outputted from the system clock 309 can be changed also steplessly.

Stepless change of the clock frequency enables the content reproducing speed, for example, to be gradually increased for high-speed reproduction as time passes or to be gradually decreased for low-speed reproduction. Even when such processing is made, no decimation of reproducing frames does occur ensuring reproduction of jerkiness-free high-quality image.

In the above embodiment, explanation has been made on an example where the change of content reproducing speed is executed based on the user's input data inputted through the input section 307 shown in FIG. 5, but the embodiment may as well take the configuration that by detecting the feature quantity proper to the content itself, the content reproducing speed is adjusted on the basis of that feature quantity in addition to the user's input data.

Figure 14:
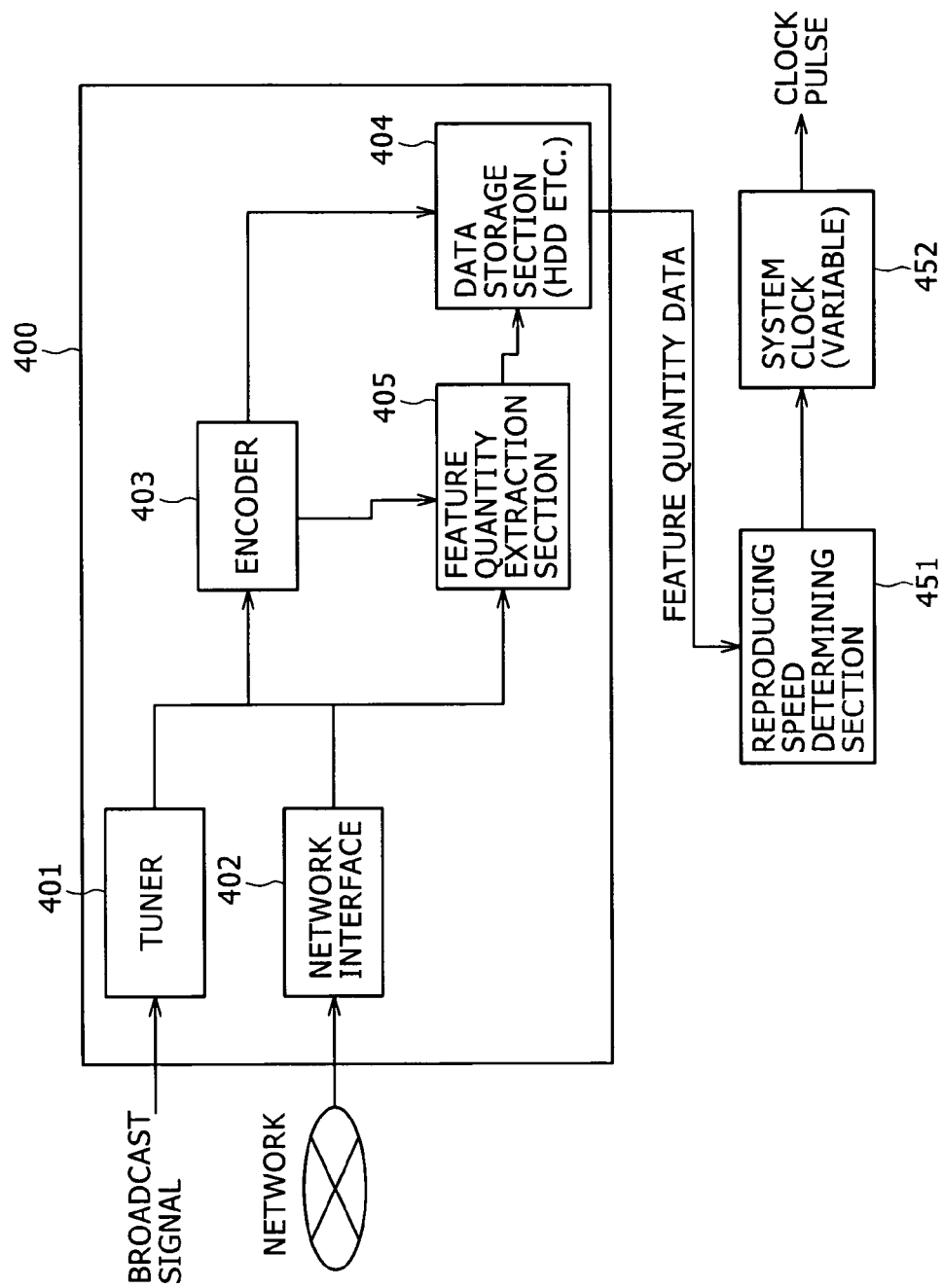
FIG. 14 is a block diagram to explain about an example of configuration for adjustment of content reproducing speed based on a feature quantity.

In reference to FIG. 14, explanation is given regarding an example of configuration to make adjustment of the content reproducing speed based on feature quantity. FIG. 14 shows the content data processing block 400, the reproducing speed determining section 451 as a part of the content reproduction control section, and the system clock 452, within the setup of the data reproduction system. The clock frequency outputted from the system clock 452 is changed on the basis of the determination of the reproducing speed determining section 451 and outputted to the data storage section to the display section, viz., the sections in charge of processing of content reproduction. The structure of supplying the clock pulses in the content reproduction system is the same as explained in reference to FIG. 5.

In the configuration shown in FIG. 14, the content data processing block includes the tuner 401 for receiving content distributed by broadcast radiowave, the network interface 402 for receiving content distributed by the network such as the Internet and LAN, the encoder 403 for processing encoding of inputted content, and the data storage section 404 such as a hard disc. The above configuration is similar to what was explained hereinbefore in reference to FIG. 4.

Further, the example of configuration shown FIG. 14 has the feature quantity extraction section 405. This feature quantity extraction section 405 is to extract the feature quantity out of the content to be stored in the data storage section 404 and such extracted feature quantity is to be stored in the data storage section 405 as the attribute data corresponding to the content.

The feature quantity extracted from the content by the feature quantity extraction section 405 means, for example, points of variation of image, or of sound data, or silent portion, etc., as a part of the data forming the content. In case the content is a broadcast drama, for example, the points of variation, such as from the body of drama to a commercial or the like points are to be extracted. Such feature quantity characterizing the content is to be tied to the content as the attribute data of the content stored in the data storage section 404 before being stored together.

The reproducing speed determining section 451 as a part of the content reproduction control section acquires the feature quantity corresponding to the content from the data storage section 404 and, based on that feature quantity, determines the content reproducing speed. For example, high-speed reproduction is to be set in silent portion, the portion where there is little variation of image, and the portion of commercial. This control is to be executed by the reproducing speed determining section 451 in accordance with a preset program.

As mentioned above, the reproducing speed determining section 451 determines the content reproducing speed and, based on such determination, carries out control of the clock pulses outputted from the system clock 452. In other words, as the content reproducing speed ascends, the control of the clock frequency works to set the frequency higher. In this way, the system clock 452 outputs a variable clock signal of the frequency that the reproducing speed determining section 451 keeps control of according to the reproducing speed.

In other words, the system clock 452 outputs, to the data storage section to display section assigned to carry out processing of content reproduction, a variable clock signal having the clock frequency controlled in conformity with the data of the reproducing speed determined based on the feature quantity at the reproducing speed determining section 451. According to this processing setup, it becomes possible to carry out processing of content reproduction at an automatically regulated content reproducing speed.

In the next place, explanation is given with reference to FIG. 15 concerning a data reproduction system that has a setup different from what is shown in FIG. 5. In the embodiment explained with reference to FIG. 5, the example of the setup was explained as that the system clock 309 that supplied one set of variable clock pulses was provided and that from that system clock 309, the clock output was inputted to all of the data storage section 301, decoding section 302, buffer control section 303, output control section 305, and output display section 306.

The reproducing speed at the data storage section and the decoding section can be set at a relatively high speed. Therefore, even if the setting is so made that the clock pulse to these sections is a fixed clock pulse of high frequency and short clock cycle and that the frequency of input clock pulse to the buffer control section, the output control section, and the output display section is made to vary according to the reproducing speed, it will be possible to prevent interruption of reproduction and decimation of frames insofar as high-speed reproduction remains within a certain reasonable extent.

FIG. 15 shows an example of configuration of the data reproduction system that has such clock pulse supplying setup as above-mentioned. In FIG. 15, the content stored in the data storage section 501 such as a hard disc is processed for decoding at the decoding section 502. Decoding processing is executed conforming, for example, to the formats of MPEG, NTSC, MUSE, etc.

The decoding section 502 outputs the resulting data of decoding processing, that is, the image and sound data, to the buffer control 503, which is to store the image and sound data in the buffer memory 504. The output control section 505 then receives the input of the data stored in the buffer memory 504 via the buffer control section 503 and outputs the image and sound data, after supplementing it with synchronizing signal and other signals the output display section 506 may require, to the output display section 506 which is provided with display screens and speakers.

In the above-mentioned configuration, the system clock 521 which supplies the fixed clock pulse, outputs a clock data including fixed cycle to the data storage section 501, the decoding section 502, and the buffer control section 503. On the other hand, a variable clock signal to be set with a clock frequency conforming to the content reproducing speed is outputted to the buffer control section 503, the output control section 505, and the output display section 506.

For example, the reproducing speed set by the user's input via the input section 507 shown in FIG. 15 is inputted to the reproducing speed determining section 508, entailing that the clock frequency of the system clock 509 is adjusted according to the reproducing speed. Thus, the system clock 509 outputs such clock signal having the frequency set in proportion to the reproducing speed, to the buffer control section 503, the output control section 505, and the output display section 506, these being the sections in charge of data processing relating to the content reproduction.

The buffer control section 503 reads out data from the data storage section 501 and the decoding section 502, carries out input processing by using the clock pulse supplied from the system clock (fixed) 521, and further executes processing of the output of the buffer data to the output control section 505 in accordance with the variable clock pulse of the system clock (variable) 509. At the buffer memory 504, clock pulse becomes different between when writing and when reading, but processing can be realized without a problem if, for example, a dual port memory is combined in the setup.

It is preferable that the clock signal having a fixed frequency outputted from the system clock 521 which outputs fixed clock pulses, should be set up as a fixed clock pulse having a frequency higher than the highest frequency of the clock signal among those variable clock signals outputted from the system clock 509 which outputs variable clock pulses. By establishing the above-mentioned setup, it becomes possible that the variable clock pulse outputted from the system clock 509 which outputs variable clock pulses, is set at the highest frequency; that even when the content reproducing speed is the fastest, processing of writing data in the buffer memory 504 is carried out at a high speed according to the fixed clock pulse which has an even higher frequency, allowing processing of writing data to be carried out faster than reading out data; and therefore that the buffer memory is not empty ensuring that no lacking of data occurs in the display.

The data reproduction system shown in FIG. 15 according to an embodiment of the present invention is so configured that the clock signal having a variable clock frequency in proportion to the content reproducing speed may be outputted only to the buffer control section 503, the output control section 505, and the output display section 506, the sections in charge of data processing relating to the content reproduction, but by satisfying the above-mentioned requirements, the system in FIG. 15 can as well display image without needing to exercise frame decimation operation at all even when the reproducing speed varies, thus realizing jerkiness-free, high-quality reproduction of image, as the configuration shown in FIG. 5.

Detailed description has been expended in the above in regard to the present invention by referring to some specific embodiments thereof. However, it is self-evident that various modifications and substitutions of these embodiments may be made by those skilled in the art within the scope not departing the essential characteristics of the present invention. In other words, disclosure of the present invention has been made herein in a mode for illustrative purposes only and should not be understood as limited thereto. Therefore, the essential characteristics and true scope of the present invention should be determined solely by referring to the appended claims.

Incidentally, it is possible to execute a sequence of processing explained in this specification by either hardware or software, or by the formation in which both are combined. In case processing by software is to be chosen, it should be carried out by having a program, in which processing sequence is recorded, installed in the memory of the computer built in the hardware exclusive for the purpose, or otherwise, by having the program installed in a general-purpose computer capable of conducting a variety of processing.

It is also possible, for example, to preliminarily record the program in a recording media, such as hard disc and ROM (Read Only Memory). Or otherwise, the program can be stored (recorded) in a flexible disc, CD-ROM (Compact Disc Read Only Memory), MO (Magneto Optical) disc, DVD (Digital Versatile Disc), magnetic disc, semiconductor memory, and other removable recording media, temporally or permanently. Such removable recording media can be offered as so-called package software.

The program may be installed in the computer from a removable recording media as above-mentioned. Besides, the program may be transferred from a download site to the computer by radio or by wire via network such as LAN (Local Area Network) and the Internet. The computer on the receiving side is to receive such program and install it in a built-in hard disc or other recording media.

Various kinds of processing described in this specification may be carried out in chronological order according as they are described, or otherwise, may be dealt with in parallel or individually depending on the capacity of the device or circumstantial needs. By the way, the "system" used in this specification means a logically integrated formation of a plurality of devices, but these devices are not necessarily limited to those contained in the same housing or cabinet.

According to an embodiment of the present invention, as explained above, the clock frequency set at a high level according as the content reproducing speed ascends is outputted from the system clock, and such variable clock signal outputted from the system clock is inputted to each processing section in charge of processing of content reproduction such as the data storage section, decoding section, buffer control section, output control section, and output display section, for the purpose of executing processing of data acquirement at the data storage section, decoding at the decoding section, writing and reading of decoded data to and from the buffer memory at the buffer control section, display control at the output control section, and data display at the output display section, while regulating the processing speed in accordance with the clock signal having the frequency conforming to the content reproducing speed. Such configuration allows all-frame variable-speed display without needing frame decimation operation even at a high-speed reproduction, for example, resulting in realization of reproduction of jerkiness-free high-quality image.

It should be understood by those skilled in the art that various modifications, combinations, sub-combinations and alterations may occur depending on design requirements and other factors insofar as they are within the scope of the appended claims or the equivalents thereof.

What is claimed is:

1. A data reproduction system for content reproduction, comprising:

a reproducing speed determining section that, based on a content reproducing speed, controls a clock pulse outputted from a system clock, making a clock frequency higher according as the content reproducing speed ascends and making the clock frequency lower according as the content reproducing speed descends;

a system clock output section that outputs variable clock signal having a frequency controlled by the reproducing speed determining section; and a content reproduction processing section that receives input of the variable clock signal outputted from the system clock and carries out data processing at a processing speed according to the inputted variable clock signal, wherein the content reproduction processing section is capable at least of acquiring the data of a reproducing object stored in a buffer memory and releasing such acquired data to a display section with processing speed kept variable according to the variable clock signal inputted from the system clock, wherein the content reproduction processing section comprises a data storage section, a decoding section, a buffer control section, an output control section, and an output display section, and wherein the buffer control section, the output control section, and the output display section are capable of receiving the variable clock signal outputted from the system clock and carrying out the processing after the processing of data readout from the buffer memory controlled by the buffer control section, while processing speed being kept variable according to the variable clock signal, and wherein the data storage section, the decoding section, and the buffer control section are capable of receiving a fixed clock signal of a fixed frequency and carrying out the processing before the processing of write data into the buffer memory controlled by the buffer control section at a fixed processing speed according to the fixed clock signal, and the frequency of the fixed clock signal is set at a frequency higher than the frequency of the clock signal that has the frequency highest among the variable clock signals outputted from the system clock.

2. The data reproduction system according to claim 1, wherein
the reproducing speed determining section controls clock frequency, if the content reproducing speed is set to be n times as fast as a standard reproducing speed, making the clock frequency of the variable clock to be set to be n times as fast as the clock frequency at the time of the standard reproduction.

3. The data reproduction system according to claim 1, wherein
the data storage section,
the decoding section,
the buffer control section,
the output control section, and
the output display section, and
are capable of receiving input of variable clock signal outputted from the system clock and executing data processing with the processing speed kept variable according to such inputted variable clock signal.

4. The data reproduction system according to claim 1, wherein
the reproducing speed determining section
determines the speed of content reproduction based on the user-established data inputted through the input section, and, further,
on the basis of such speed of reproduction as determined, determines the clock frequency to be outputted from the system clock.

5. The data reproduction system according to claim 1, wherein
the reproducing speed determining section
receives input of feature quantity data of the object content to be reproduced,
determines the content reproducing speed based on such feature quantity data, and
on the basis of such reproducing speed as determined, determines the clock frequency to be outputted from the system clock.

6. A data reproducing method for content reproduction, comprising:
a clock frequency control step to control a clock pulse outputted from a system clock according to a content reproducing speed, increasing the clock frequency following an ascent of a content reproducing speed while lowering the clock frequency following a descent of the content reproducing speed;
a system clock output step to output from the system clock a variable clock signal having a frequency controlled in the clock frequency control step; and
a content reproduction processing step to receive input of variable clock signal outputted from the system clock and to carry out data processing at a processing speed according to the inputted variable clock signal,
wherein
the content reproduction processing step is capable of acquiring at least the data of reproducing object stored in the buffer memory and releasing such acquired data to the display section with the processing speed kept variable according to the variable clock signals inputted from the system clock, wherein the content reproducing processing step includes acquiring processing of data from the data storage section,
decoding processing at the decoding section,
processing of writing and reading decoded data to and from the buffer memory at the buffer control section,
display control processing at the output control section, and
data display processing at the output display section,
wherein
the buffer control section, the output control section, and the output display section receives the input of the variable clock signal outputted from the system clock and carries out the processing after the processing of data readout from the buffer memory controlled by the buffer control section, while varying processing speed according to the variable clock signals, and
wherein
the data storage section, decoding section, and buffer control section receives the input of the fixed clock signal of a fixed frequency and carries out the processing before the processing of writing data into the buffer memory controlled by the buffer control section at a fixed processing speed according to the fixed clock signal, and
the frequency of the fixed clock signal is set at a frequency higher than the frequency of the clock signal that has the frequency highest among the variable clock signals outputted from the system clock.

7. The data reproducing method according to claim 6, wherein
the clock frequency control step carries out control of clock frequency, if the content reproducing speed is set to be n times the standard reproducing speed, making the clock frequency of the variable clock to be set n times the clock frequency at the time of standard reproduction.

8. The data reproducing method according to claim 6, wherein
the acquiring step, the decoding step, the processing step, the display control processing step, and the data display processing step are carried out while receiving the input of the variable clock signal outputted from the system clock and varying the processing speed according to the inputted variable clock signal.

9. The data reproducing method according to claim 6, wherein
the clock frequency control step determines the speed of content reproduction based on the user-established data inputted through the input section, and, further, on the basis of such speed of reproduction as determined, determines the clock frequency to be outputted from the system clock.

10. The data reproducing method according to claim 6, wherein the clock frequency control step includes:
receiving input of feature quantity data of the object content to be reproduced,
determining the content reproducing speed based on such feature quantity data, and
determining the clock frequency to be outputted from the system clock on the basis of such reproducing speed as determined.

11. A non-transitory computer program storage medium having instructions that when executed by a processor in a data reproduction system perform steps including:
a clock frequency control step to control clock pulse to be outputted from a system clock conforming to the content reproduction speed, increasing the clock frequency higher following the ascent of the content reproduction speed while decreasing the clock frequency lower following the descent of content reproduction speed;

a system clock output step for outputting from the system clock a variable clock signal controlled at the clock frequency control step; and a content reproduction processing step to receive the input of the variable clock signal outputted from the system clock and to carry out data processing at a processing speed conforming to the inputted variable clock signal;

the content reproduction processing step carrying out at least the processing to acquire the data of the reproducing object stored in the buffer memory and to release such acquired data to the display section with processing speed kept variable according to the variable clock signal inputted from the system clock, wherein the content reproducing processing step includes acquiring processing of data from the data storage section, decoding processing at the decoding section, processing of writing and reading decoded data to and from the buffer memory at the buffer control section, display control processing at the output control section, and data display processing at the output display section, wherein the buffer control section, the output control section, and the output display section receives the input of the variable clock signal outputted from the system clock and carries out the processing after the processing of data readout from the buffer memory controlled by the buffer control section, while varying processing speed according to the variable clock signals, and wherein the data storage section, decoding section, and buffer control section receives the input of the fixed clock signal of a fixed frequency and carries out the processing before the processing of writing data into the buffer memory controlled by the buffer control section at a fixed processing speed according to the fixed clock signal, and the frequency of the fixed clock signal is set at a frequency higher than the frequency of the clock signal that has the frequency highest among the variable clock signals outputted from the system clock.

* * * * *